G. W. CONLEE.
Machine for Making Wooden Pins.
No. 164,526. Patented June 15, 1875.
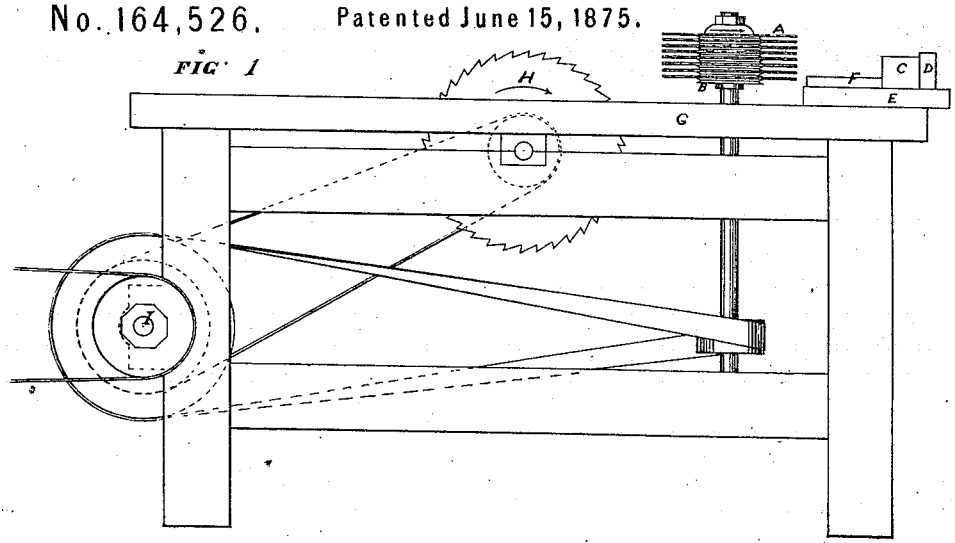
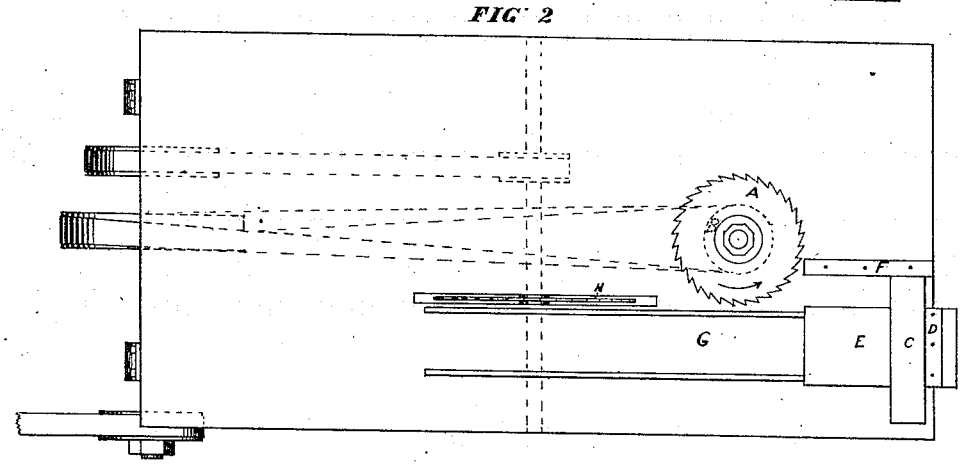
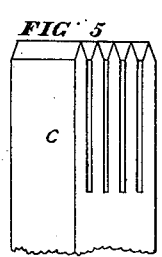
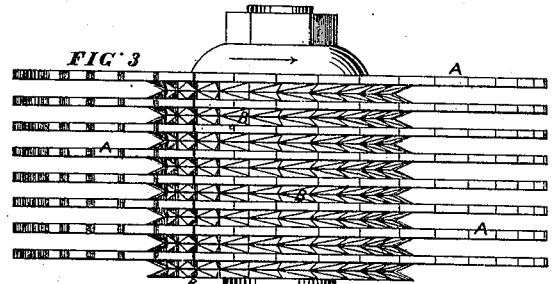
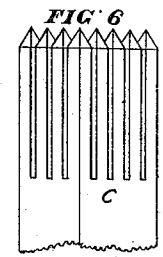
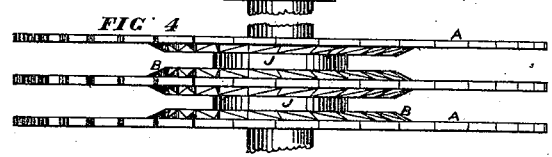
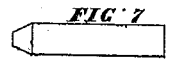
Witnesses: C. Palmer, W. Konrad Jr.
Inventor: George W. Conlee
THE GRAPHIC CO.PHOTO-LITH.39 & 41 PARK PLACE,N.Y.

UNITED STATES PATENT OFFICE.

GEORGE W. CONLEE, OF OSHKOSH, WISCONSIN, ASSIGNOR OF ONE-THIRD HIS RIGHT TO HIRAM M. DYER, OF SAME PLACE.

IMPROVEMENT IN MACHINES FOR MAKING WOODEN PINS.

Specification forming part of Letters Patent No. 164,526, dated June 15, 1875; application filed March 23, 1875.

*To all whom it may concern:*

Be it known that I, GEORGE W. CONLEE, of Oshkosh, in the county of Winnebago and State of Wisconsin, have invented certain Improvements in Machines for Making Wooden Pins, of which the following is a specification:

The nature of my invention relates to the use of washers to spread the plates of a gang of single and double saws apart, so as to make pins of different sizes.

Figure 1 is a side elevation of my machine. Fig. 2 is a top view or plan. Fig. 3 is an enlarged elevation of the gang-saw. Fig. 4 is a partial elevation of the same, showing the introduction of washers. Fig. 5 is a corner view of a block passed once through the gang-saw. Fig. 6 the same passed twice through the gang-saw, the pins being finished ready to be cut off. Fig. 7 shows the form of pin made when washers are used.

The gang-saw is composed of saws A A and B B, of such relative diameters as to make pins of the required lengths. The saw B is made of two plates, complementing each other, the teeth being beveled from the point to the base on the sides which face each other. Of course it is not essential that the saws should be so adjusted on the shaft as to bring the teeth of the saws directly over each other, though, for convenience, they are so represented in the drawings. The plates of the double saw B may be separated, and a washer, J J, Fig. 4, introduced between them to vary the size of the pins. Motion is communicated through any shaft, I, provided with pulleys, as required. A block, C, to be cut into pins is placed against a stop, D, on carriage E, and butted against a stop, F, on table G, on line with the valley of the teeth of double saw B. The carriage E is moved along its guides and the end of the block, passing through the gang-saw is cut, as represented in Fig. 5. The block is then turned on its side and again passed through the gang-saw, which cuts it into pins, as represented in Fig. 6. The carriage, with the block in the same position, is now moved forward to the cut-off saw H, which cuts the pins off exactly at their base when the saw H is placed on a line with the outer diameter of the gang-saw. Or the saw H may be so adjusted on its shaft as to cut off the pins longer or shorter, as required.

Having thus described my invention, what I claim as new, and desire to secure by Letters Patent, is—

In combination with saws B B and slitting-saws A A the adjusting-washers J J, substantially as specified.

GEORGE W. CONLEE.

Witnesses:
  C. PALMER,
  L. W. HALSEY.